United States Patent
Ng et al.

(10) Patent No.: US 8,458,511 B2
(45) Date of Patent: Jun. 4, 2013

(54) FAULT ISOLATION USING CODE PATHS

(75) Inventors: Tsz Him (Adrian) Ng, Menlo Park, CA (US); Alex Tsukerman, Foster City, CA (US); Kothanda Umamageswaran, Sunnyvale, CA (US); Roger Hansen, San Francisco, CA (US); Umesh Panchaksharaiah, Richmond, CA (US)

(73) Assignee: Oracle International Corporation, Redwood Shores, CA (US)

( * ) Notice: Subject to any disclaimer, the term of this patent is extended or adjusted under 35 U.S.C. 154(b) by 242 days.

(21) Appl. No.: 12/885,323

(22) Filed: Sep. 17, 2010

(65) Prior Publication Data

US 2012/0072776 A1 Mar. 22, 2012

(51) Int. Cl.
*G06F 11/00* (2006.01)

(52) U.S. Cl.
USPC .............................. 714/4.2; 714/11

(58) Field of Classification Search
USPC .................... 714/4.11, 4.12, 4.2, 11, 38.1
See application file for complete search history.

(56) References Cited

U.S. PATENT DOCUMENTS

| | | | |
|---|---|---|---|
| 4,425,615 A | 1/1984 | Swenson et al. | |
| 5,765,034 A * | 6/1998 | Recio ........................... | 710/107 |
| 6,886,084 B2 | 4/2005 | Kawashima et al. | |
| 6,922,754 B2 | 7/2005 | Liu et al. | |
| 6,928,451 B2 | 8/2005 | Mogi et al. | |
| 7,069,324 B1 | 6/2006 | Tiwana et al. | |
| 7,093,162 B2 * | 8/2006 | Barga et al. ................... | 714/15 |
| 7,159,076 B2 | 1/2007 | Madter | |
| 7,165,144 B2 | 1/2007 | Choubal et al. | |
| 7,228,354 B2 | 6/2007 | Chambliss et al. | |
| 7,290,090 B2 | 10/2007 | Madter | |
| 7,373,554 B2 | 5/2008 | Chandrasekaran | |
| 7,461,147 B1 | 12/2008 | Mowat et al. | |
| 7,506,103 B2 | 3/2009 | Madter | |
| 7,904,562 B2 | 3/2011 | Takase et al. | |

(Continued)

FOREIGN PATENT DOCUMENTS

| | | |
|---|---|---|
| CN | 101150483 A | 3/2008 |
| JP | 2002-278704 A | 9/2002 |
| JP | 2003-150419 A | 5/2003 |
| JP | 2004-038758 A | 2/2004 |

OTHER PUBLICATIONS

U.S. Appl. No. 12/563,073, filed Sep. 18, 2009, Notice of Allowance, Dec. 27, 2011.

(Continued)

*Primary Examiner* — Marc Duncan
(74) *Attorney, Agent, or Firm* — Hickman Palermo Truong Becker Bingham Wong LLP

(57) ABSTRACT

Techniques are provided for isolating faults in a software program by providing at least two code paths that are capable of performing the same operation. When a fault occurs while the one of the code paths is being used to perform an operation, data that indicates the circumstances under which the fault occurred is stored. For example, a fault-recording mechanism may store data that indicates the entities that were involved in the failed operation. Because they were involved in an operation that experienced a fault, one or more of those entities may be "quarantined". When subsequent requests arrive to perform the operation, a check may be performed to determine whether the requested operation involves any of the quarantined entities. If the requested operation involves a quarantined entity, a different code path is used to perform the operation, rather than the code path from which the entity is quarantined.

29 Claims, 4 Drawing Sheets

U.S. PATENT DOCUMENTS

| | | | |
|---|---|---|---|
| 2002/0143755 | A1 | 10/2002 | Wynblatt et al. |
| 2003/0115324 | A1 | 6/2003 | Blumeanau et al. |
| 2004/0003087 | A1 | 1/2004 | Chambliss et al. |
| 2004/0062106 | A1 | 4/2004 | Ramesh et al. |
| 2004/0117441 | A1 | 6/2004 | Liu et al. |
| 2005/0210202 | A1 | 9/2005 | Choubal et al. |
| 2005/0283637 | A1* | 12/2005 | Coldicott et al. .............. 714/2 |
| 2006/0224451 | A1 | 10/2006 | Kerschbrock et al. |
| 2006/0277439 | A1* | 12/2006 | Davia et al. ................. 714/38 |
| 2007/0220348 | A1* | 9/2007 | Mendoza et al. .............. 714/38 |
| 2007/0260819 | A1 | 11/2007 | Gao et al. |
| 2008/0016283 | A1 | 1/2008 | Madter |
| 2008/0046736 | A1 | 2/2008 | Arimilli et al. |
| 2008/0104283 | A1 | 5/2008 | Shin et al. |
| 2008/0147599 | A1 | 6/2008 | Young-Lai |
| 2008/0244209 | A1 | 10/2008 | Seelam et al. |
| 2008/0307266 | A1* | 12/2008 | Chandrasekaran .............. 714/38 |
| 2008/0307267 | A1 | 12/2008 | Chandrasekaran |
| 2009/0248871 | A1 | 10/2009 | Takase et al. |
| 2010/0332901 | A1* | 12/2010 | Nussbaum et al. ............. 714/16 |
| 2012/0144234 | A1* | 6/2012 | Clark et al. ................... 714/16 |

OTHER PUBLICATIONS

U.S. Appl. No. 12/562,984, filed Sep. 18, 2009, Office Action, Jan. 27, 2012.

IBM TDB, "A Scheduling Algorithm for Processing Mutually Exclusive Workloads in a multi-system Configuration", ip.com dated Aug. 19, 2002 (3 pages).

U.S. Appl. No. 12/691,146, filed Jan. 21, 2010, Office Action, Aug. 17, 2012.

U.S. Appl. No. 12/562,984, filed Sep. 18, 2009, Final Office Action, Aug. 23, 2012.

U.S. Appl. No. 13/418,150, filed Mar. 12, 2012, Office Action, Sep. 12, 2012.

* cited by examiner

FAULT ISOLATION USING CODE PATHS

FIELD OF THE INVENTION

The present invention relates to fault isolation and, more specifically, to fault isolation using multiple code paths.

BACKGROUND

In the context of software systems, updates that improve performance also tend to introduce new errors. A user that has recently upgraded to an "improved" version of a software program may soon regret the decision to upgrade if the user repeatedly experiences errors produced by the new code. The situation becomes even more frustrating when the error occurs when the user is using a feature that had worked flawlessly prior to the upgrade.

A storage server is an example of a program whose performance can be significantly improved by increasing the complexity of the tasks it performs. For example, conventional storage servers simply read and write data blocks to persistent storage in response to I/O requests that expressly identify the data blocks. However, the performance of storage servers that are used to satisfy I/O requests from database servers may be significantly improved, for example, using the techniques described in:

U.S. patent application Ser. No. 12/562,984, filed Sep. 18, 2009, entitled "Hash Join Using Collaborative Parallel Filtering In Intelligent Storage With Offloaded Bloom Filters", the entire contents of which is incorporated herein by this reference;

U.S. patent application Ser. No. 12/563,073, filed Sep. 18, 2009, entitled "Storage-Side Storage Request Management", the entire contents of which is incorporated herein by this reference; and U.S. patent application Ser. No. 12/691,146, filed Jan. 21, 2010, entitled "Selectively Reading Data From Cache And Primary Storage", the entire contents of which is incorporated herein by this reference.

The techniques described in the above-listed applications are examples of how the performance of a particular type of program (in this case, a storage server) may be improved by increasing the complexity of the program. Unfortunately, increasing the complexity of any program increases the likelihood of faults, and any program that experiences the same recurring faults under the same recurring circumstances will tend to frustrate the program's users.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for isolating faults in a software program by providing at least two code paths that are capable of performing the same operation. The two code paths are referred to herein as the "default code path" and the "safe code path". The default code path for an operation is the path that is used to perform the operation when the operation is requested under circumstances that have not historically caused a fault. On the other hand, the safe code path is used when the operation is requested under circumstances that have historically caused a fault. Typically, the default code path would contain optimization intended to improve the performance of the operation relative to the performance achieved by the safe code path, but those optimizations result in more complex code that has a greater chance of experiencing problems.

According to an embodiment, when a fault occurs while the default code path is being used to perform an operation, data that indicates the circumstances under which the fault occurred is stored. For example, a fault-recording mechanism may store data that indicates the entities that were involved in the failed operation. Because they were involved in an operation that experienced a fault, one or more of those entities may be "quarantined". When subsequent requests arrive to perform the operation, a check may be performed to determine whether the requested operation involves any of the quarantined entities. If the requested operation involves a quarantined entity, the safe code path may be used to perform the operation, rather than the default code path.

In an alternative embodiment, only a single code path is provided for performing the operation. If a requested operation involves an entity that has been quarantined from that single code path, then the server does not execute the operation. Instead, the server may, for example, send an error message that indicates that the operation failed. The error message may include an indication of which entity involved in the requested operation is quarantined.

System Overview

Figure 1:
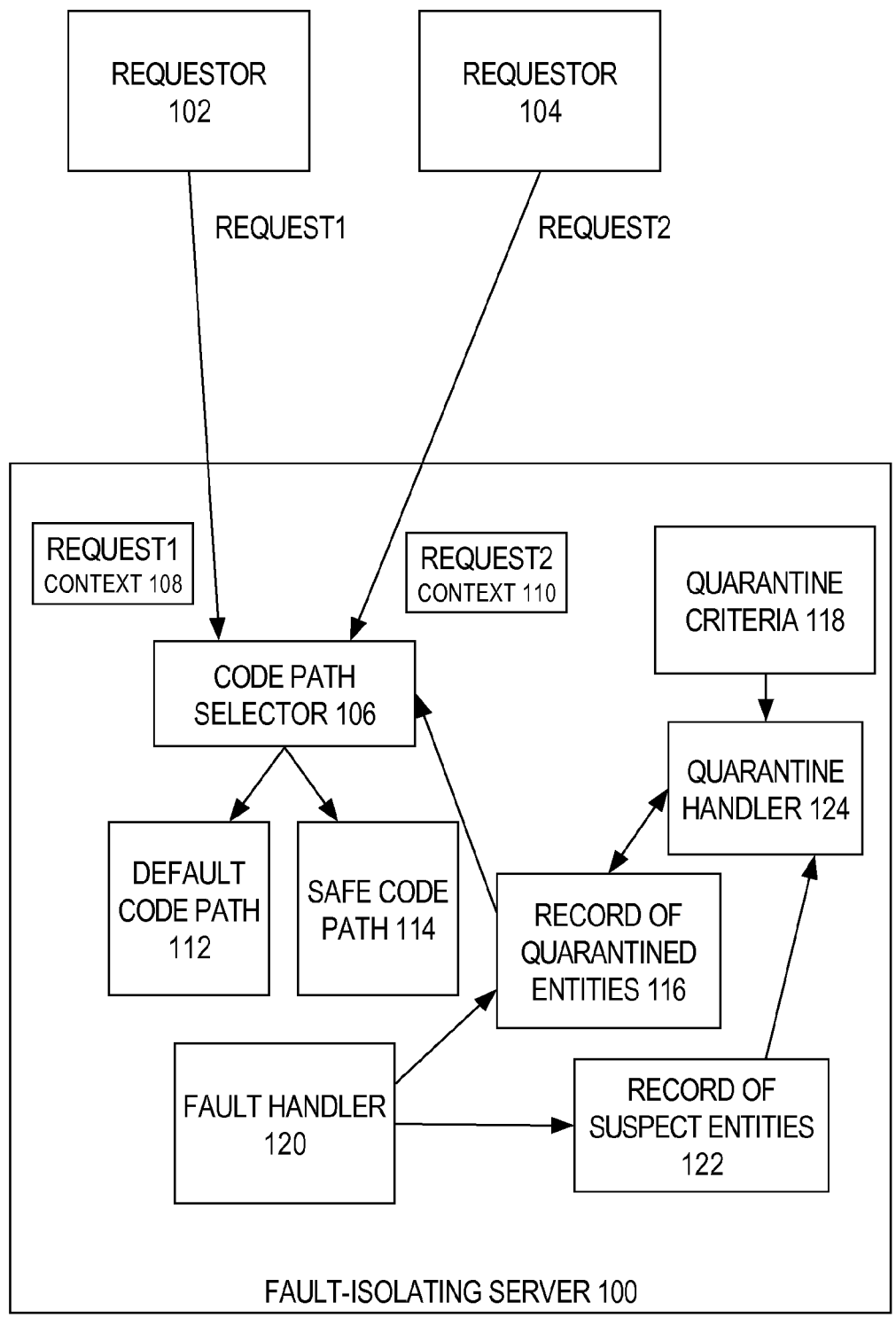
FIG. 1 is a block diagram of a fault-isolating server, according to an embodiment of the invention.

FIG. 1 is a block diagram of a system that employs the fault isolation techniques described herein, according to an embodiment. Referring to FIG. 1, a fault-isolating server 100 includes two code paths for performing the same operation: default code path 112 and safe code path 114. When a fault occurs while safe code path 112 is being used to perform the operation, a fault handler 120 within fault-isolating server 100 obtains information about the entities that were involved in the failed operation, and stores the information in a record of suspect entities 122.

In response to fault handler 120 storing information in the record of suspect entities 122, a quarantine handler 124 determines whether the quarantine criteria 118 is satisfied for any of the suspect entities. If the quarantine criteria 118 is satisfied for any of the suspect entities, quarantine handler 124 records those entities in the record of quarantined entities 116.

Fault-isolating server 100 also includes a code path selector 106. Code path selector 106 is responsible for selecting which of the two code paths 112 and 114 should be used to perform a requested operation. The code path that is selected by code path selector 106 is selected based, at least in part, on whether any of the entities involved in the requested operation are listed in the record of quarantined entities 116 that is maintained by quarantine handler 124. According to one embodiment, if none of the entities involved in the requested operation are listed in the record of quarantined entities 116, code path selector 106 selects default code path 112 to perform the operation. Otherwise, code path selector 106 selects the safe code path 114 to perform the operation.

Code path selector 106 and fault handler 120 may obtain the information about the entities that are involved in an operation from the request context associated with the operation. In the embodiment illustrated in FIG. 1, fault-isolating server 100 has received two requests (request1 and request2) from two distinct requestors (requestor 102 and requestor 104, respectively). When selecting which code path to use for request1, code path selector 106 compares the entities identified in request1 context 108 to those listed in the record of quarantined entities 116. Similarly, when selecting which code path to use for request2, code path selector 106 compares the entities identified in request2 context 110 to those listed in the record of quarantined entities 116.

If a fault occurs while request1 is being serviced using default code path 112, fault handler 120 records the entities identified in request1 context 108 in the record of suspect entities 122. Similarly, if a fault occurs while request2 is being serviced using default code path 112, fault handler 120 records the entities identified in request2 context 110 in the record of suspect entities 122.

Suspect Entities

The entities that are involved in an operation that experiences a fault occurs are referred to herein as "suspect entities". The nature of the suspect entities may vary from implementation to implementation based on the nature of the program that is performing the operation and the nature of the operation.

For example, in the context of a storage server that receives I/O requests from database servers, the suspect entities for a failed operation may be (a) the database server that is making the request, (b) the SQL statement that caused the database server to make the request, (c) the SQL plan into which that SQL statement was compiled, (d) the specific SQL plan step that resulted in the I/O request that produced the fault, and/or (e) the storage location that was targeted by the I/O request. These are merely examples of the type of suspect entities that may be recorded when a fault occurs within a storage server, and the techniques described herein are not limited to any particular type of suspect entity, nor to any particular type of fault-isolating server.

Quarantine Criteria

As was mentioned above, when a fault occurs during performance of an operation, the entities involved in the operation are recorded as suspect entities. In one embodiment, all suspect entities are automatically quarantined the first time that they are involved in an operation during which a fault occurs. In such an embodiment, fault handler 120 need not maintain a record of quarantined entities 116 separate from the record of suspect entities 122, since the two records would always list the same entities.

However, under some circumstances, automatically quarantining all suspect entities would lead to underutilization of the default code path (which typically has superior performance). For example, if an entire database server is quarantined because one of the I/O operations it requested caused a fault in the storage server, then all subsequent requests from that database server would be restricted to the less optimized safe code path 114, even though using the default code path 112 for the vast majority of those subsequent requests would not have caused faults.

To reduce the chance of applying the quarantine too liberally, a separate set of quarantine criteria 118 may be established for each type of suspect entity. For example, in the context of a storage server that services I/O requests from database servers, the quarantine criteria may be established according to the following rules:

the storage location targeted by an I/O request is immediately quarantined
  a SQL plan step is immediately quarantined
  a SQL plan is quarantined only if involved in three distinct faults
  a SQL statement is quarantined only if involved in five distinct faults
  a database server is quarantined only if involved in ten distinct faults
  everything is quarantined if the storage server experiences more than ten faults in an hour In an embodiment that uses this set of quarantine criteria, the default code path 112 will continue to be used for virtually all subsequent requests from a particular database server, even though a previous request from that database server caused a fault when using the default code path 112. The only requests from that database server for which the safe code path 114 would be used are requests that involve the same storage location or SQL plan step as the request that caused the fault. This behavior is preferable, for example, when the root cause of the fault is more likely to be the storage location or SQL plan step than the database server itself.

Hierarchical Quarantine Criteria

In some situations, the entities involved in an operation will have hierarchical relationships with each other. For example, a database server may issue I/O requests related to many SQL statements, each SQL statement may have many SQL plans, and each SQL plan may have many SQL plan steps. Similarly, a database server may issue I/O requests that relate to many database objects, and each database object may have many storage locations that are targeted by I/O requests.

According to one embodiment, the quarantine criteria established for a particular type of entity may take into account these hierarchical relationships. Specifically, the rule that determines whether an entity of one type is quarantined may be based on how many entities that are hierarchically below that entity have been quarantined. For example, in the context of a storage server that services I/O requests from database servers, the quarantine criteria may be established according to the following rules:

the storage location targeted by an I/O request is immediately quarantined
  a database object is quarantined if more than 20% of its storage locations have been quarantined
  a SQL plan step is immediately quarantined a SQL plan is quarantined if three or more of its SQL plan steps are quarantined a SQL statement is quarantined if two or more of its SQL plans have been quarantined a database server is quarantined only if 20% of the SQL statements that it has issued in the last hour have been quarantined everything is quarantined if three or more database servers have been quarantined Cascading Quarantines The use of hierarchical quarantine criteria may result in escalating quarantines. For example, in a storage server that uses the hierarchical quarantine criteria described above, a single fault may result not only in the quarantine of the SQL plan step involved in the operation that caused the fault, but in the quarantine of the SQL plan step may trigger the quarantine of the SQL plan (if the SQL plan already has had two SQL plan step faults). Likewise, the quarantine of the SQL plan may trigger the quarantine of the SQL statement (if the SQL statement already has one SQL plan fault). The quarantine of the SQL statement, in turn, may trigger the quarantine of the database server (if quarantine of the SQL statement causes the 20% threshold to be exceeded). The quarantine of the database server may trigger the quarantine of everything (if two other database servers were already quarantined).

Release from Quarantine

Using the techniques described herein, entities that are likely to be the causes of errors are quarantined to prevent repeated errors using the default code path 112. However, various events may decrease the likelihood that an already-quarantined entity will continue to cause errors. In response to one of those events, the quarantine handler 124 may release the quarantined entity from quarantine, to allow that entity to use the default code path 112 once again.

For example, assume that a particular disk location was quarantined in response to satisfying the relevant quarantine criteria 118 for disk locations. When a disk location is quarantined, it is possible that the disk location contains corrupted data. New data that is written to that same disk location is not likely to be corrupted. Consequently, in response to detecting that new data is being written to the particular disk location that was quarantined, the quarantine handler 124 may release that particular disk location from quarantine by removing the particular disk location from the record of quarantined entities 116.

As another example, all quarantines may ultimately be the result of bugs in the logic of the default code path 112. If that logic is updated, then the default code path 112 may no longer cause those same faults. Consequently, in response to a patch being applied to the default code path 112, quarantine handler 124 may release all quarantined entities from quarantine.

The writing of data to a disk location, and the application of a patch, are merely two examples of events that may trigger the automatic release of quarantined entities from quarantine. However, any event that reduces the likelihood that a previously experienced fault will recur may trigger the release of the relevant quarantined entities. The techniques described herein are not limited to any particular release-triggering events.

In addition to removing an entity from the record of quarantined entities 116, releasing the entity from quarantine may also involve deleting information from the record of suspect entities 122. For example, in an embodiment where the record of suspect entities 122 stores historic information about which entities were involved in faults experienced by the default code path 112, the application of a patch to the default code path may trigger the automatic deletion of all of that historic information.

As another example, if three faults involving a particular entity caused the quarantine of the particular entity, then in response to the entity being released from quarantine, information about one of those three faults may be deleted from the record of suspect entities. By removing from the record only one, instead of all three, of the previous faults, the quarantine handler 124 ensures that a single new fault involving the entity will cause the entity to be quarantined once again.

Cascading Releases

As mentioned above, when a fault-isolating server 100 uses hierarchical quarantine criteria, quarantines may cascade up the hierarchy of suspect entities. Similarly, release of an entity from quarantine may trigger a cascade of releases. For example, in a storage server that uses the hierarchical quarantine criteria described above, a releasing from quarantine a single SQL plan step involved trigger the release of an SQL plan (if the SQL plan ceases to have three quarantined SQL plan steps). Likewise, the release of the SQL plan may trigger the release of the SQL statement (if the SQL statement ceases to have two quarantined SQL plans). The release of the SQL statement, in turn, may trigger the release of the database server (if release of the SQL statement causes the faults to fall below the 20% threshold). The release of the database server may trigger the release of everything (if less than three database servers remain quarantined).

Alternative Code Paths

In the embodiments described above, two code paths exist for performing the same operation: a relatively faster but more complex code path (the default code path), and a relatively slower but simpler code path (the safe code path). However, the code paths that are used to perform the operation need not have a faster-but-more-complex/slower-but-safer relationship to each other. Rather, the code paths may simply use different logic for accomplishing the same operation. For example, one code path may make use of one optimization, while another makes use of another optimization. In some cases, the first optimization may perform better, while in other cases the second optimization may perform better.

Under these circumstances, neither code path may be the designated "default" for all requests. Rather, for operations that do not involve any quarantined entities, the code path selector 106 may base the code path selection on some other criteria, such as the amount of data requested, the database object targeted by the operation, etc. Further, a separate record of suspect entities 122 and quarantined entities 116 may be maintained for each of the alternative code paths. When an entity is quarantined from the code path to which it was initially assigned, code path selector 106 simply selects one of the alternative code paths for subsequent requests involving the same entity.

Figure 2:
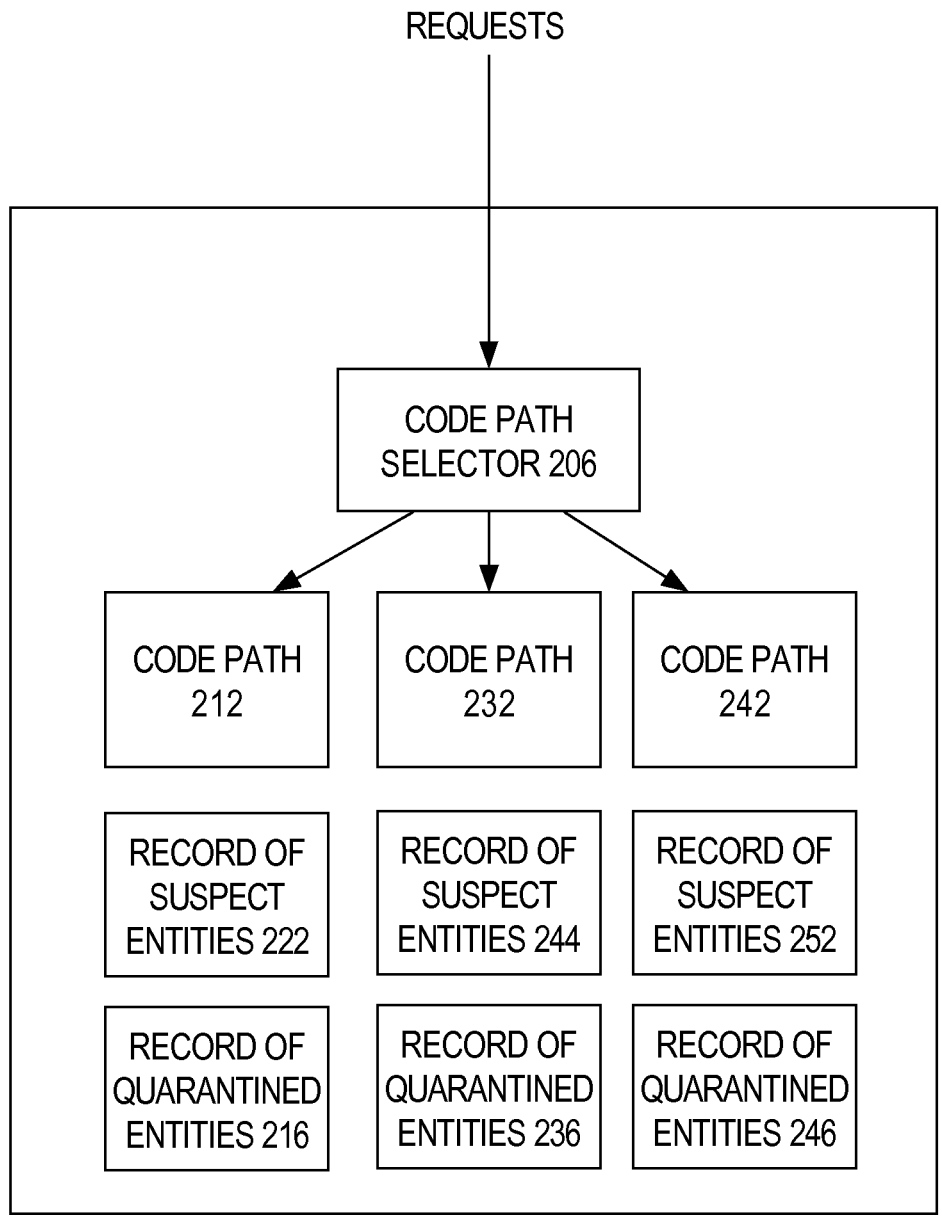
FIG. 2 is a block diagram of a fault-isolating server that maintains separate quarantine information for each of multiple alternative code paths, according to an embodiment of the invention.

Referring to FIG. 2, it is a block diagram that illustrates an embodiment in which three alternative code paths 212, 232 and 242 are available for performing the same operation. In the illustrated embodiment, each code path has its own separate record of suspect entities and record of quarantined entities. Specifically, record of suspect entities 222 and record of quarantined entities 216 are maintained for code path 212, record of suspect entities 244 and record of quarantined entities 236 are maintained for code path 232, and record of suspect entities 252 and record of quarantined entities 246 are maintained for code path 242.

When code path selector 206 receives a request that does not involve any entity that is quarantined from any of the code paths, code path selector 206 chooses among the code paths based on criteria other than the quarantine records. However, if the request involves an entity that is quarantined relative to one of the alternative code paths, then code path selector 206 selects among the remaining two code paths based on other criteria. On the other hand, if the request involves an entity that is quarantined relative to two of the three code paths, then code path selector 206 automatically selects the one code path from which the entity has not been quarantined.

In an embodiment where separate quarantine information is maintained for each code path, the patching of a code path may release only the quarantines of that code path. The quarantines of the code paths that were not patched stay in effect (since the patch does not decrease the likelihood that previously-experienced faults in those paths will reoccur).

Probationary Quarantines

An operation that causes a fault may involve multiple entities, but it may be that only one of those entities that is responsible for the fault. For example, assume that a fault occurs involving a first entity and a second entity. Initially, the quarantine handler 124 may quarantine the first entity but not the second entity. Subsequently, the second entity may be involved in one or more additional faults. Under these circumstances, the quarantine handler may determine that it was the second entity, and not the first entity, that caused the initial fault. Consequently, the quarantine handler 124 may respond by quarantining the second entity and releasing the first entity from quarantine.

A quarantine that is released in response to the quarantining of another entity is referred to herein as a "probationary" quarantine. According to one embodiment, the first quarantine placed on a particular type of entity may be a probationary quarantine. According to one embodiment, if an entity is involved in an additional fault after being released from a probationary quarantine, then the entity is quarantined once again with a non-probationary quarantine.

Example Process for Isolating Faults

Figure 3:
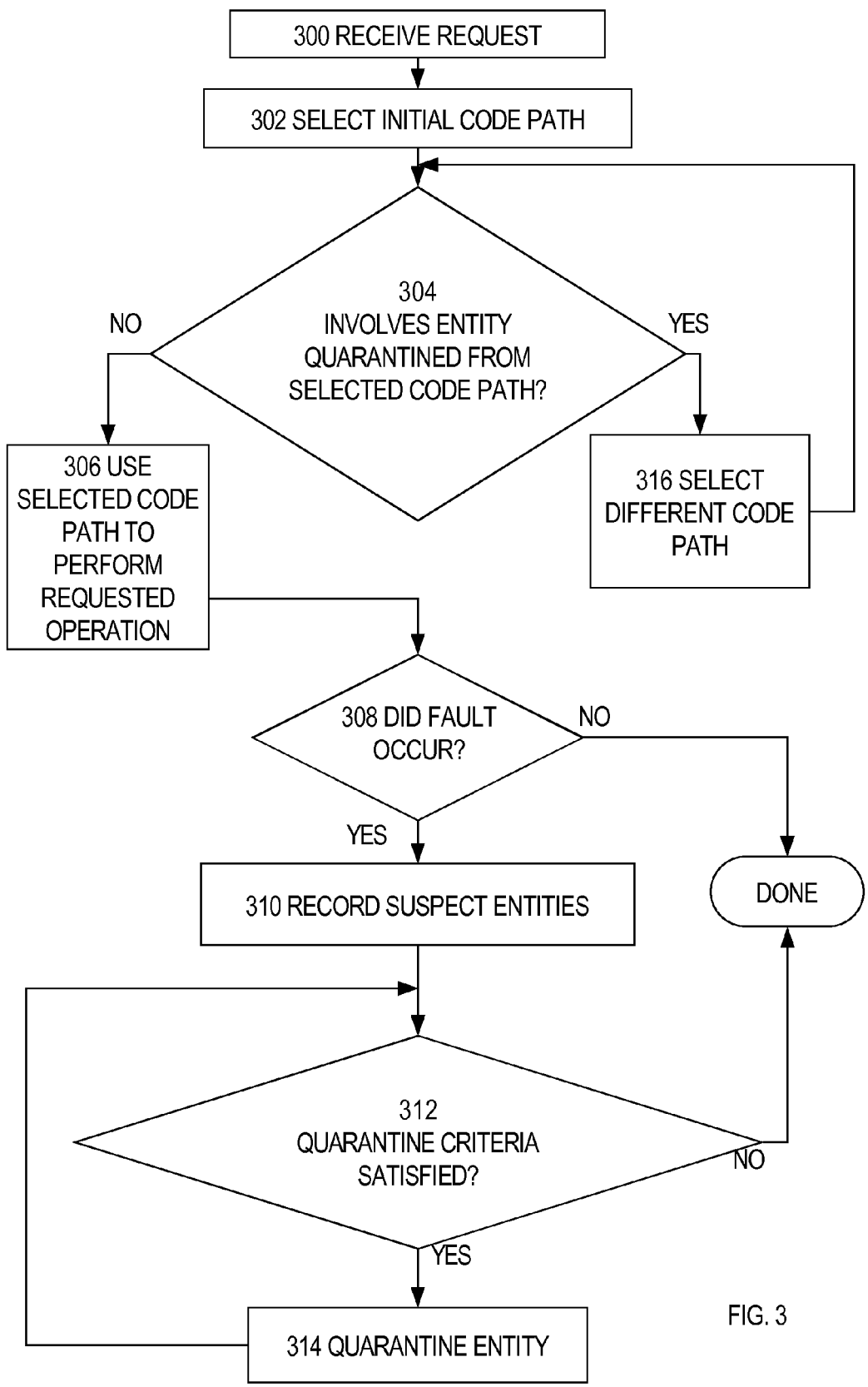
FIG. 3 is a flowchart showing steps for performing fault-isolation in a server, according to an embodiment of the invention.

Referring to FIG. 3, it is a flowchart that illustrates steps for isolating faults according to an embodiment of the invention. At step 300, a request is received to perform an operation. At step 302, an initial code path is selected for performing the requested operation. The initial code path that is selected may be the "default" code path, or may be a code path that is selected based on criteria other than whether the entities involved in the operation have previously experienced faults.

At step 304, it is determined whether the requested operation involves an entity that has been quarantined from the code path that was selected in step 302. If the requested operation involves an entity that has been quarantined from the code path that was selected in step 302, then at step 316 a different code path for executing the same operation is selected. After selecting a different code path at step 316, control returns to step 304 to determine whether the requested operation involves an entity that has been quarantined from the newly selected code path. The loop defined by steps 304 and 316 repeats until a code path is selected from which none of the entities involved in the operation have been quarantined. Such a code path may be, for example, a "safe code path" from which no entities are ever quarantined.

Once a code path has been selected from which none of the entities involved in the requested operation have been quarantined, control passes to step 306. At step 306, the requested operation is performed using the selected code path. At step 308, it is determined whether a fault occurred during performance of the requested operation. If no fault occurred, then the process is done.

On the other hand, if a fault occurred during performance of the operation, then at step 310 one or more entities that were involved in the operation are recorded as suspect entities relative to the code path that was selected for performing the operation. At step 312, it is determined whether the fault caused quarantine criteria to be satisfied for any entity relative to the selected code path. If no quarantine criteria was satisfied for any entity, then the process is done.

However, if the fault and subsequent recording of suspect entities caused quarantine criteria to be satisfied for any entity, then the entity is quarantined, relative to the selected code path, in step 314, and control passes back to step 312 to see if quarantine criteria has been satisfied relative to any other entity. Steps 312 and 314 effectively form a loop during which quarantines can cascade up an entity hierarchy. When it is ultimately determined at step 312 that quarantine criteria is not satisfied for any more entities, the process is done.

EXAMPLE

Isolating Faults in a Storage Server

The techniques described herein may be used to isolate faults in any type of server that has two or more code paths for performing the same operation. However, for the purpose of explanation, specific details shall be provided hereafter of how those techniques may be applied to the specific context of a storage server that is configured to service I/O requests from one or more database servers. However, these specific details are merely examples of one implementation, and the techniques may be implemented numerous ways both within and outside of the context of storage servers.

According to one storage server implementation, on a crash, the storage server tries to detect which entity (e.g. SQL plan step, disk blocks) had caused the crash. Once an entity is identified, it is quarantined. If an entity is quarantined, it is not able to perform the same offload optimization which had previously crashed (e.g. predicate-push, storage index). Instead, the quarantined entity is serviced using a traditional mechanism (e.g. Block IO). In addition, if the same database server is found to crash the same cell for N times, all offload optimizations are disabled for the database server. This prevents a storage server from hitting the same crash repeatedly, hence increasing the stability of the storage tier and avoiding potential cluster outage.

In one embodiment, a storage server includes a component referred to herein as a Quarantine Manager. In one possible implementation, Quarantine Manager is a global object in the storage server that services storage server components that want faults to be quarantined.

Quarantine Manager

Quarantine Manager provides a generic framework to isolate faults, which can be used by any optimizing module (e.g. IORM, Flash Cache, etc) in a storage server. However, for the purpose of explanation, examples shall be given relative to (a) offload optimization for predicate-push, and (b) offload optimization for storage index.

While numerous types of entities are involved in these two types of optimization, for the purpose of simplifying the explanation, it shall be assumed that the types of entities to which quarantines apply are: SQL plan step, disk region, and database servers.

According to one embodiment, in response to a crash during use of one of these optimizations, both the SQL plan step as well as the disk region being processed are automatically quarantined. In addition, if the same database server has caused N storage server crashes, then the database server will be quarantined as well.

It may be useful to immediately quarantine the SQL plan step because it is frequently the case that the crash is related to the specific SQL plan step (or row source) that is being performed at the time of the crash. So, by isolating the problematic SQL plan step, the storage server has a good chance of avoiding the crash from happening again.

According to one embodiment, to isolate a SQL plan step, the storage server uses a combination of plan hash value and plan line number (or row source ID) to identify the specific SQL plan step. A plan hash value is a hash value of a SQL plan, while a plan line number is a step in the plan indicating the access method (e.g. full table scan, fast full scan, etc) and filter. A combination of the plan hash value and the plan line number will uniquely identify a SQL plan step.

A badly corrupted disk block can also crash a storage server. For example, a badly corrupted disk block (due to a bad flash card) can bypass the cache layer block header and checksum check and cause incorrect query results. The same problem could well cause the storage server to crash if a disk block is corrupted. According to one embodiment, when storage server crashes, the storage server quarantines an entire 1 MB region that was worked on by storage server, instead of just a database block.

With respect to the database server that made the request, all offload optimization will be disabled for the database server if the database server is quarantined. According to one embodiment, a database server is quarantined when the storage server runs into N crashes as a result of operations on behalf of one database server. Quarantining the database server serves to avoid one misbehaving database server from destabilizing the storage tier, which will then affect other database servers.

As mentioned above, in one embodiment, if a crash is found in a monitored region of the code (e.g. predicate-push), then both the 1 MB disk region and the SQL plan step are quarantined. If three different SQL plan steps from the same database server have been quarantined, then the database server itself will be quarantined. Similarly, if three different database servers are quarantined, then the storage server will be executed in "pass-through" mode. In pass-through mode, predicate-push is disabled for the storage server.

According to one embodiment, fault isolation is facilitated by a Quarantine Manager, which is a new storage server object which keeps track of all entities that may have caused a crash. Quarantine Manager indicates to its client if a given entity is quarantined. Examples of entity types that could be quarantined by Quarantine Manager include database server, SQL plan step, and disk regions.

When a fatal error happens, Quarantine Manager will look into the thread that crashed to identify the entity being monitored. If an entity is being monitored, Quarantine Manager will assume that that entity caused the crash, and it will quarantine the entity. If an entity is quarantined, it will not able to perform the offload optimization which had previously crashed (e.g. predicate-push, storage index) until the entity is dequarantined.

Registering Entities to be Monitored

According to one embodiment, an entity is explicitly registered for monitoring. If an entity is not registered at the time of a crash, no entity will be held responsible for the crash by Quarantine Manager. Internally, Quarantine Manager uses a hashtable to keep track of all quarantined entities. It is Quarantine Manager's responsibility to indicate to its client that a given entity has been quarantined. However, it is up to the client to decide when to check for and how to act on a quarantined entity.

One example of a Quarantine Manager's client is a PredicateCachePut job. The job will handle the request that the database server issues to initiate a prediate-push scan. As part of the job, PredicateCachePut will query QuarantineManger to check if either the database or the SQL plan step has been quarantined. If so, the scan will operate in pass-through mode in which blocks will be returned without any offload optimization.

Another example is the PredicateFilter job. For each 1 MB region (as identified by grid-disk-GUID, offset) that it operates on, the PredicateFilter job will first check with Quarantine Manager to see if the region involved in an operation is quarantined. If so, the PredicateFilter job will use PassThruMode to process the region so that the optimization, the usual source of problem, can be bypassed completely. If the region is not quarantined, then the PredicateFilter job will then ask Quarantine Manager to monitor both the 1 MB region as well as the SQL plan step before it asks the optimized code path to process the region.

As soon as the processing of the 1 MB region is finished, PredicateFilter will ask Quarantine Manager to unmonitor them. Should a crash happen before the unmonitor, Quarantine Manager will quarantine the entity monitored.

Dequarantining Entities

In one embodiment, a quarantined entity will be dequarantined either when a user explicitly requests it, or the storage server detects that a change has made which may have fixed the problem. For instance, a write to a quarantined disk block may have fixed the problems and hence the corresponding quarantined disk region will be dequarantined.

Persisting Quarantine Information

In one embodiment, the state of Quarantine Manager persists across reboots of the storage server, as Quarantine Manager needs to remember crashes across reboots. Consequently, on crashes or shutdowns, the storage server will save the hash tables used by Quarantine Manager to a file. During boot-time, Quarantine Manager will read the state file and reconstruct the state.

According to one embodiment, in order to have an entity monitored, a module invokes a monitorEntity routine within Quarantine Manager, with a specification of the entity, before the operation is attempted. Immediately after the operation, the module invokes a finishMonitoringEntity within Quarantine Manager to deregister the monitor. While registered for monitoring, the entity information is stored in a UserThread. Consequently, when a fatal error occurs, the error handling module invokes Quarantine Manager to handle the fault (after it successfully creates an incident and dumps the system state). Quarantine Manager will then look at the information stored in UserThread to find out what entity is being monitored. The entities being monitored will be assumed to cause the crash. Quarantine Manager will remember that this entity has crashed one crash. If no information is stored in the UserThread, then Quarantine Manager will not hold any entity responsible for the crash.

The Entities Hash Table

As mentioned above, Quarantine Manager tells clients whether a given entity has been quarantined. In order to do that, Quarantine Manager uses a hashtable to maintain the quarantined entities. Such a hashtable is called the "Entities Hashtable". According to one embodiment, there will only be one Entities Hashtable in Quarantine Manager which stores entities of any type (e.g. database server, SQL plan step, disk region, etc).

In one embodiment, each bucket of Entities Hash Table contains a list of Entity Hash Object. A list is used to handle collision of hash keys. Inside each Entity Object is stored a crash reference count, a magic number, description of the quarantined entity, a flag to indicate whether the entity is manually quarantined, and a flag to indicate whether a cell alert has been sent for the quarantined entity. In addition, some diagnostics information such as the crash reason is stored in the object.

Crash reference count is used to count the number of crashes an entity that causes. By default, if an entity has caused one crash, the entity will be quarantined. The existence of the crash reference count is to enhance the flexibility of the framework. For example, the reference count can be used so that only if the count for a particular entity reaches some predetermined threshold N, will that particular entity be quarantined.

Magic number is to verify data integrity of the hash object, since the storage server updates/creates a hash table object at a time where the state of the system may not be healthy. The use of a magic number will reduce the chance of having the next incarnation of storage server reading corrupted or incorrect state.

Description of Quarantined Entity contains entity type, such as SQL plan step or disk region, as well as details of the entity type—for instance, if the type is SQL plan step, this description contains both the plan hash value and the plan line number. If the type is disk region, it contains disk offset and the grid disk ID. The description uniquely identifies the entity.

In one embodiment, the Entities Hashtable will be implemented based on a Locked Hashtable, which provides the locking mechanism for concurrency control. Concurrency control is useful because hashtable lookups and hashtable entry addition/deletion, though rare, can happen at the same time.

According to one embodiment, the locking mechanism works as follows: each hashtable lookup requires holding a reader lock of the list of Entity Object (each bucket has one list), while hashtable addition/deletion requires holding a writer lock for the list.

When Quarantine Manager does a hashtable lookup, Quarantine Manager does a dirty check to see how many Entity Hash Objects are in the hashtable. If there are none, then Quarantine Manager will skip the look up.

In addition, before Quarantine Manager traverses a particular list of Entity Hash Objects hanging off a hash bucket, Quarantine Manager does another dirty read of the size of the list. If the list size is zero, then Quarantine Manager will skip the traversal.

According to one embodiment, Quarantine Manager also performs the dequarantine check after Quarantine Manager does the sendMessage( ) in the CachePut job. That way, the check will not have an effect on the write latency.

Hash collisions would put a number of Entity Hash Objects into the same hash bucket, each of which will be chained together by a list. When Quarantine Manager does a look up to check if any entity is quarantined, Quarantine Manager goes to the hash bucket and traverses the list of Entity Hash Object. For each of the Entity Hash Object, Quarantine Manager checks whether the entity specified by the client matches the attribute of the Entity Hash Object being examined. For that, Quarantine Manager will first checks whether the entity type matches and, if so, checks whether the entity description in the hash object matches what the client specifies.

Adding Entities to the Entities Hash Table

According to one embodiment, there are three ways for a new entity to be added to the hashtable. Additions of entities to the Entities Hashtable are rare, because number of additions is typically tied to the number of crashes the storage server has. First, when a fatal error happens, Quarantine Manager will find out which entities are to blame. Then, QuarantineManager will write all crash information (i.e. entity info, crash diagnostics info) to a thread-specific crash information file. During boot-up, Quarantine Manager will look at the files and update the hashtable.

In an alternative embodiment, the hashtable may be updated at the time of the crash. However, updating the hashtable during boot up may be preferable to avoid doing too much in the exception handler.

According to one embodiment, a user may expressly request to quarantine an entity. Upon receiving such a request, Quarantine Manager creates the hash object and will mark the corresponding Hash Object as manually quarantined. Quarantine Manager will also send a cell alert under these circumstances.

On a crash, Quarantine Manager creates Entity Hash Objects to represent the entities that caused the crash. In addition, Quarantine Manager creates another Entity Hash Object to represent the DBID (the identifier of the specific database server) that caused the crash if the database server has caused a number of crashes that is greater than a predetermined threshold. From then on, the database server will be quarantined.

On boot-time, Quarantine Manager builds a map mapping DBIDs and the number of storage server crashes the respective database servers have caused. Quarantine Manager uses the map to look up the number of crashes for a given database server on fatal error. This is to avoid traversing Entities Hashtable while the storage server is dying.

Deleting Entities from the Entities Hash Table

Once an entity is dequarantined, it will be removed from the Entities Hashtable. According to one embodiment, any of the following operations will dequarantine a quarantined entity:

1) User submits a request to explicitly dequarantine an entity

2) Writes to quarantined 1 MB disk region: Quarantine Manager dequarantines the entire disk region when Quarantine Manager knows that a write to the disk region is happening. The assumption here is that a write to any block in the entire 1 MB region will fix the problem, and so the region will be dequarantined. Alternatively, a quarantined disk region will be dequarantined if there are writes to N blocks in that region.

3) RPM change: When Quarantine Manager notices a change indicating that a code path has been patched, Quarantine Manager purges all the quarantined entities relative to that code path.

Saving Quarantine Manager State

In the event of a fatal fault, Quarantine Manager saves the state before the storage server crashes. However, it is possible for the storage server to crash while saving its state. According to one embodiment, this situation is handled as follows:

When Quarantine Manager state is being saved, the storage server will write a signature—"QM STATE START" and "QM STATE END"—at the beginning and the end of the state file which it can use to verify the integrity of the file during boot-time. The state file is only considered as valid only if both of the signatures are seen.

When the storage server starts up and after it verifies the consistency of the existing state file, the storage server will make a copy of the state file. If the consistency check failed, then the storage server will use the copy of the state file. If the consistency check of the copy fails, then the storage server will boot without quarantining entities.

Constructing Quarantine Manager State during Boot-Time

During boot-time, the storage server will both construct Entities Hashtable and read from the thread-specific crash info files. To construct the hashtable, the storage server will parse the state file. Each of the rows in the file will represent exactly one Entity Hash Object. Also, for each Entity Hash Object, the storage server will assign an EntityID. The Entity ID is used user to manipulate Entity Hash Objects (which represent quarantined entities). No two Entity Hash Objects can have the same entity ID.

The reason for reading from the crash info files is that they store some crash info from which the storage server needs to construct a new Entity Hash Object or update existing Hash Object (by bumping up the crash reference count for the object and updating the stats). After the insert or update, if Quarantine Manager decides that the entity needs to be quarantined, then it will create an incident which will then be picked up by MS which will then generate the alert.

Also, the storage server will check whether the RPM version on the state file matches the RPM version that is being used. If not, no Entity Hash Objects will be created and the state file will be removed. During boot-time, the storage server will build a map mapping DBID and the number of Storage server crashes the DB has caused. The storage server will use the map to look up the number of crashes a given DB has on fatal error in order to avoid traversing Entities Hashtable while Storage server is dying. The number of crashes is used to decide whether a database should be quarantined.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
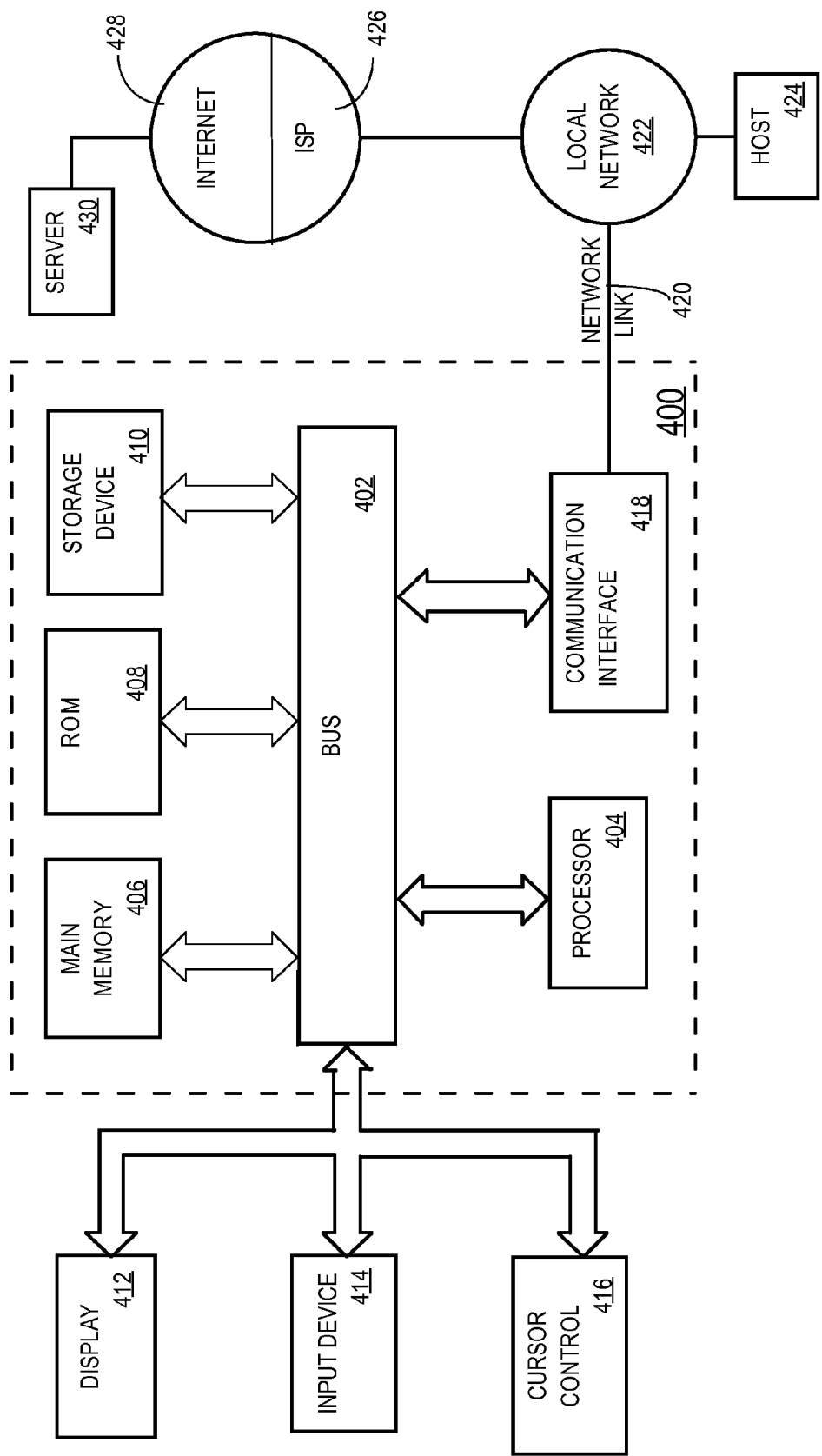
FIG. 4 is a block diagram illustrating a computer system upon which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising:
   receiving a first request to perform a first operation that may be performed by a first code path within a server;
   detecting occurrence of a fault during performance of the first operation by the first code path;
   identifying a first entity involved in the first operation that experienced the fault;
   wherein the first entity is a first type of entity, wherein the first entity is one of: a SQL plan step, a SQL plan, a SQL statement, or a storage location targeted by an I/O request;
   in response to the first entity being involved in the first operation that experienced the fault, determining that quarantine criteria for the first code path has been satisfied relative to the first entity;
   in response to determining that quarantine criteria for the first code path has been satisfied relative to the first entity, storing data that indicates that the first entity is quarantined relative to the first code path while continuing to allow the first code path to be executed for operations involving other entities of the first type of entity;
   after storing data that indicates that the first entity is quarantined relative to the first code path, receiving a second request to perform a second operation;
   in response to the second request, determining whether the first entity is involved in the second operation;
   in response to determining that the first entity is involved in the second operation and that the first entity is quarantined relative to the first code path, responding to the second request without using the first code path;
   wherein the method is performed by one or more computing devices.

2. The method of claim 1 wherein the step of responding to the second request without using the first code path includes responding to the second request without performing the second operation.

3. The method of claim 1 wherein:
   the first operation and the second operation are operations that may be performed by any one of a plurality of code paths within the server;
   the plurality of code paths include the first code path and a second code path;
   the second code path is different from the first code path; and
   the step of responding to the second request without using the first code path includes selecting the second code path to perform the second operation.

4. The method of claim 3 wherein:
   the quarantine criteria for the first code path applies to the first type of entity;
   the first operation involves a second entity that is a second type of entity to which second quarantine criteria applies; and the method further comprises, after the first operation experienced the fault, determining that the second quarantine criteria has not been satisfied relative to the second entity.

5. The method of claim 3 wherein the quarantine criteria for the first code path is satisfied by the first entity being in a particular number of operations, performed by the first code path, that experience faults.

6. The method of claim 5 wherein the particular number is greater than one.

7. The method of claim 3 further comprising:
receiving a third request to perform a third operation that may be performed by any one of the plurality of code paths within the server;
selecting the second code path to perform the third operation;
detecting occurrence of a fault during performance of the third operation by the second code path;
identifying a second entity involved in the third operation that experienced the fault;
in response to the second entity being involved in the third operation that experienced the fault, determining that quarantine criteria for the second code path has been satisfied relative to the second entity;
in response to determining that quarantine criteria for the second code path has been satisfied relative to the second entity, storing data that indicates that the second entity is quarantined relative to the second code path.

8. The method of claim 7 further comprising:
after storing data that indicates that the second entity is quarantined relative to the second code path, receiving a fourth request to perform a fourth operation that can be performed by any one of the plurality of code paths;
in response to the fourth request, determining whether the second entity is involved in the fourth operation;
in response to determining that the second entity is involved in the fourth operation and that the second entity is quarantined relative to the second code path, selecting a code path, of the plurality of code paths, other than the second code path, to perform the fourth operation.

9. The method of claim 8 wherein selecting a code path, of the plurality of code paths, other than the second code path, to perform the fourth operation includes selecting the first code path to perform the fourth operation.

10. The method of claim 3 wherein the first and second code paths are code paths within a storage server that services I/O requests from database servers.

11. The method of claim 10 wherein the first entity is a disk location.

12. The method of claim 1 wherein the first entity is a SQL plan step.

13. The method of claim 1 wherein the first entity is a SQL plan.

14. The method of claim 1 wherein the first entity is a SQL statement.

15. The method of claim 1 wherein the first entity is a storage location targeted by the particular I/O request.

16. A method comprising:
receiving a first request to perform a first operation that may be performed by a first code path within a server;
detecting occurrence of a fault during performance of the first operation by the first code path;
identifying a first entity involved in the first operation that experienced the fault;
in response to the first entity being involved in the first operation that experienced the fault, determining that quarantine criteria for the first code path has been satisfied relative to the first entity;
in response to determining that quarantine criteria for the first code path has been satisfied relative to the first entity, storing data that indicates that the first entity is quarantined relative to the first code path;
after storing data that indicates that the first entity is quarantined relative to the first code path, receiving a second request to perform a second operation;
in response to the second request, determining whether the first entity is involved in the second operation;
in response to determining that the first entity is involved in the second operation and that the first entity is quarantined relative to the first code path, responding to the second request without using the first code path;
wherein the first entity has a hierarchical relationship relative to a plurality of other entities;
wherein the quarantine criteria is satisfied relative to the first entity in response to a particular number of said other entities being quarantined relative to the first code path;
wherein the method is performed by one or more computing devices.

17. The method of claim 16 wherein the first entity is one of:
a SQL plan step, a SQL plan, or a database server.

18. A non-transitory computer-readable storage that stores instructions which, when executed by one or more processors, causes the one or more processors to perform steps comprising:
receiving a first request to perform a first operation that may be performed by any one of a plurality of code paths within a server;
selecting a first code path, of the plurality of code paths, to perform the first operation;
detecting occurrence of a fault during performance of the first operation by the first code path;
identifying a first entity involved in the first operation that experienced the fault;
wherein the first entity is a first type of entity, wherein the first entity is one of: a SQL plan step, a SQL plan, a SQL statement, or a storage location targeted by an I/O request;
in response to the first entity being involved in the first operation that experienced the fault, determining that quarantine criteria for the first code path has been satisfied relative to the first entity;
in response to determining that quarantine criteria for the first code path has been satisfied relative to the first entity, storing data that indicates that the first entity is quarantined relative to the first code path while continuing to allow the first code path to be executed for operation involving other entity of the first type of entity;
after storing data that indicates that the first entity is quarantined relative to the first code path, receiving a second request to perform a second operation that can be performed by any one of the plurality of code paths;
in response to the second request, determining whether the first entity is involved in the second operation;
in response to determining that the first entity is involved in the second operation and that the first entity is quarantined relative to the first code path, selecting a second code path of the plurality of code paths to perform the second operation;
wherein the second code path is different from the first code path.

19. The non-transitory computer-readable storage of claim 18 wherein:
- the quarantine criteria for the first path applies to the first type of entity;
- the first operation involves a second entity that is a second type of entity to which second quarantine criteria applies; and
- the steps further comprise, after the first operation experienced the fault, determining that the second quarantine criteria has not been satisfied relative to the second entity.

20. The non-transitory computer-readable storage of claim 18 wherein the quarantine criteria for the first code path is satisfied by the first entity being in a particular number of operations, performed by the first code path, that experience faults.

21. The non-transitory computer-readable storage of claim 20 wherein the particular number is greater than one.

22. The non-transitory computer-readable storage of claim 18 wherein the steps further comprise:
- receiving a third request to perform a third operation that may be performed by any one of the plurality of code paths within the server;
- selecting the second code path to perform the third operation;
- detecting occurrence of a fault during performance of the third operation by the second code path;
- identifying a second entity involved in the third operation that experienced the fault;
- in response to the second entity being involved in the third operation that experienced the fault, determining that quarantine criteria for the second code path has been satisfied relative to the second entity;
- in response to determining that quarantine criteria for the second code path has been satisfied relative to the second entity, storing data that indicates that the second entity is quarantined relative to the second code path.

23. The non-transitory computer-readable storage of claim 22 wherein the steps further comprise:
- after storing data that indicates that the second entity is quarantined relative to the second code path, receiving a fourth request to perform a fourth operation that can be performed by any one of the plurality of code paths;
- in response to the fourth request, determining whether the second entity is involved in the fourth operation;
- in response to determining that the second entity is involved in the fourth operation and that the second entity is quarantined relative to the second code path, selecting a code path, of the plurality of code paths, other than the second code path, to perform the fourth operation.

24. The non-transitory computer-readable storage of claim 23 wherein selecting a code path, of the plurality of code paths, other than the second code path, to perform the fourth operation includes selecting the first code path to perform the fourth operation.

25. The non-transitory computer-readable storage of claim 18 wherein the first and second code paths are code paths within a storage server that services I/O requests from database servers.

26. The non-transitory computer-readable storage of claim 25 wherein the first entity is a disk location.

27. A non-transitory computer-readable storage that stores instructions which, when executed by one or more processors, causes the one or more processors to perform steps comprising:
- receiving a first request to perform a first operation that may be performed by any one of a plurality of code paths within a server;
- selecting a first code path, of the plurality of code paths, to perform the first operation;
- detecting occurrence of a fault during performance of the first operation by the first code path;
- identifying a first entity involved in the first operation that experienced the fault;
- in response to the first entity being involved in the first operation that experienced the fault, determining that quarantine criteria for the first code path has been satisfied relative to the first entity;
- in response to determining that quarantine criteria for the first code path has been satisfied relative to the first entity, storing data that indicates that the first entity is quarantined relative to the first code path;
- after storing data that indicates that the first entity is quarantined relative to the first code path, receiving a second request to perform a second operation that can be performed by any one of the plurality of code paths;
- in response to the second request, determining whether the first entity is involved in the second operation;
- in response to determining that the first entity is involved in the second operation and that the first entity is quarantined relative to the first code path, selecting a second code path of the plurality of code paths to perform the second operation;
- wherein the second code path is different from the first code path;
- wherein the first entity has a hierarchical relationship relative to a plurality of other entities; and
- wherein the quarantine criteria is satisfied relative to the first entity in response to a particular number of said other entities being quarantined relative to the first code path.

28. The non-transitory computer-readable storage of claim 27 wherein the first entity is one of: a SQL plan step, a SQL plan, or a database server.

29. A storage server comprising:
- storage for storing data that belongs to databases managed by one or more database servers;
- a first code path for handling I/O requests from the one or more database servers;
- a second code path for handling I/O requests from the one or more database servers;
- a code path selector configured to determine whether entities involved in I/O requests are quarantined from the first code path and, when an entity involved in a particular I/O request is quarantined from the first code path, causing the particular I/O request to be handled by the second code path;
- wherein the entity is a first type of entity, wherein the entity is one of a SQL plan step, a SQL plan, a SQL statement, or a storage location targeted by the particular I/O request;
- a fault handler configured to store information about which entities are involved in faults when faults occur while the first code path is being used to service I/O requests; and
- a quarantine handler configured to determine, based on which entities are involved in faults, whether quarantine criteria is satisfied for those entities, and to store data that indicates that the entities are quarantined in response to determining that the quarantine criteria is satisfied while continuing to allow the first code path to be executed for operations involving other non-quarantined entities of the first type of entity.

\* \* \* \* \*

UNITED STATES PATENT AND TRADEMARK OFFICE
CERTIFICATE OF CORRECTION

| | |
|---|---|
| PATENT NO. | : 8,458,511 B2 |
| APPLICATION NO. | : 12/885323 |
| DATED | : June 4, 2013 |
| INVENTOR(S) | : Ng et al. |

It is certified that error appears in the above-identified patent and that said Letters Patent is hereby corrected as shown below:

In the Specification

In column 10, line 18, delete "prediate" and insert -- predicate --, therefor.

Signed and Sealed this
First Day of October, 2013

Teresa Stanek Rea
*Deputy Director of the United States Patent and Trademark Office*